(12) United States Patent
Uemura et al.

(10) Patent No.: US 6,243,392 B1
(45) Date of Patent: Jun. 5, 2001

(54) CLIENT-OPTIMIZED DATA TRANSMISSION SYSTEM AND METHOD

(75) Inventors: Jose Uemura; Takashi Sakakura, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/866,240

(22) Filed: May 30, 1997

(30) Foreign Application Priority Data

Oct. 18, 1996 (JP) .................................................. 8-276207

(51) Int. Cl.[7] .............................. H04J 3/00; H04L 12/00
(52) U.S. Cl. ......................... 370/465; 370/477; 709/232
(58) Field of Search .................................. 370/465, 468, 370/477, 521; 345/428; 709/231, 232, 233, 237

(56) References Cited

U.S. PATENT DOCUMENTS

| | | | |
|---|---|---|---|
| 5,309,562 | * 5/1994 | Li ........................................... | 709/237 |
| 5,347,632 | 9/1994 | Filepp et al. . | |
| 5,764,235 | * 6/1998 | Hunt et al. ............................ | 345/428 |
| 5,778,187 | * 7/1998 | Monteiro et al. ..................... | 709/231 |
| 5,835,495 | * 11/1998 | Ferriere ................................ | 370/465 |

FOREIGN PATENT DOCUMENTS

| | | |
|---|---|---|
| 60-59841 | 4/1985 | (JP) . |
| 6224877 | 8/1994 | (JP) . |

* cited by examiner

*Primary Examiner*—Min Jung

(57) ABSTRACT

Data transmission system and methods in which data is automatically selected based upon the processing ability of a client and the condition of a data transmission line connecting a server and the client. A terminal attribute unit that collects ability characteristics of the client and a line controller that collects the transmission rate of the data transmission line are provided in the server. A data attribute provider provides a proper data type and data amount of transmitting data in a profile based upon the collected information about the client. A data transmission agent refers to a correspondence table and selects data having a proper data amount. Then, the data transmission agent transmits the selected data to the client.

24 Claims, 12 Drawing Sheets

Fig.2

| ATTRIBUTES OF WIRELESS TERMINAL | |
|---|---|
| CHARACTERS | 160 |
| PIXELS | 300×200 |
| COLORS | 16 |
| SOUND | NO |
| POINTER | YES |
| KEYBOARD | NO |

401 — CHARACTERS
402 — PIXELS
403 — COLORS
404 — SOUND
405 — POINTER
406 — KEYBOARD

Fig.3

| ATTRIBUTES OF PC TERMINAL | |
|---|---|
| CHARACTERS | 2600 |
| PIXELS | 1152×864 |
| COLORS | 65536 |
| SOUND | YES |
| POINTER | YES |
| KEYBOARD | YES |

401 — CHARACTERS
402 — PIXELS
403 — COLORS
404 — SOUND
405 — POINTER
406 — KEYBOARD

Fig.7

| | 311:PROFILE | |
|---|---|---|
| DYNAMIC IMAGE | NO | DATA TYPE |
| STILL IMAGE | YES | DATA TYPE |
| SOUND | NO | DATA TYPE |
| DATA AMOUNT | 75000 BYTES | DATA AMOUNT |

Fig.8

| | 311:PROFILE | |
|---|---|---|
| DYNAMIC IMAGE | YES | DATA TYPE |
| STILL IMAGE | YES | DATA TYPE |
| SOUND | YES | DATA TYPE |
| DATA AMOUNT | 750000 BYTES | DATA AMOUNT |

Fig. 10

| | |
|---|---|
| WIRELESS TERMINAL | DATA AMT = (10 Min. × 60 Sec. × 1 KB/Sec.) · (1.0-0.0) · (1.0-0.0) · (1.0)<br>= 600 KB<br>= 75000 BYTES |
| PC TERMINAL | DATA AMT = (10 Min. × 60 Sec. × 10 KB/Sec.) · (1.0-0.0) · (1.0-0.0) · (1.0)<br>= 6000 KB<br>= 750000 BYTES |

Fig.11

CORRESPONDENCE TABLE — 309

TABLE 1:
| | |
|---|---|
| DYNAMIC IMAGE | YES |
| STILL IMAGE | YES |
| SOUND | YES |
| DATA AMOUNT | 683189 BYTES |

TABLE 2:
| | |
|---|---|
| DYNAMIC IMAGE | NO |
| STILL IMAGE | YES |
| SOUND | YES |
| DATA AMOUNT | 108605 BYTES |

TABLE 3:
| | |
|---|---|
| DYNAMIC IMAGE | NO |
| STILL IMAGE | NO |
| SOUND | YES |
| DATA AMOUNT | 23812 BYTES |

TABLE 4:
| | |
|---|---|
| DYNAMIC IMAGE | NO |
| STILL IMAGE | YES |
| SOUND | NO |
| DATA AMOUNT | 88605 BYTES |

TABLE 5:
| | |
|---|---|
| DYNAMIC IMAGE | NO |
| STILL IMAGE | NO |
| SOUND | NO |
| DATA AMOUNT | 3812 BYTES |

CLIENT-OPTIMIZED DATA TRANSMISSION SYSTEM AND METHOD

BACKGROUND OF THE INVENTION

1. Field of the Invention

This invention relates to a client-optimized data transmission system and method in various transmission environments in which many computers of various kinds are mutually connected. Particularly, this invention relates to a data transmission system and method which satisfies users accessing a data transmission service.

2. Description of the Related Art

Since data networks among computers, e.g., the Internet, have become popular, data providing services, e.g., World Wide Web (WWW), have also become popular. In a data providing service, data to be provided is loaded on a server computer (a server, hereinafter) which is connected to the Internet, and a large number of general users, i.e. client computers (clients, hereinafter) are connected to the server via the Internet. The clients request the server to transmit data and obtain the data.

Normally, in the WWW, a current WWW server sends the same data at the request of a client regardless of the condition of a transmission line which connects the server and the client and regardless of the client's ability to receive and process the data. Otherwise, the WWW server requests the client to select a data set, and sends the data set to the client.

In this method, even when lines are busy or the client is a wireless terminal with a very low transmission rate or the client does not have an image display function, unnecessary data, e.g., image data for a client which does not have an image display function, is sent to the client. This is irritating for the users. Therefore, the users often give up obtaining data from the WWW.

A conventional technique for controlling a transmission rate between computers is disclosed in Japanese Unexamined Published Patent Application SHO 60-59841. More particularly, SHO 60-59841 discloses a technique which optimizes a transmission rate between the computers by obtaining a desired transmission rate from a receiving computer and transmitting data at the desired transmission rate of the receiving computer.

In Japanese Unexamined Published Patent Application HEI 6-224877, a conventional technique for controlling a number of transmission lines based on an amount of data to be transmitted is disclosed.

As discussed above, conventional servers, such as the WWW server send data to the client regardless of the transmission rate of the line between computers and the ability of the client. This causes inconvenience for the users. This invention intends to solve such inconvenience for the users accessing data providing services.

SUMMARY OF THE INVENTION

One object of the present invention is to provide a data transmission system and method which satisfies users in a data transfer between computers in a client-server configuration.

Another object of the present invention is to provide a data transmission system and method which satisfies users accessing a data providing service.

Another object of the present invention is to remove inconvenience due to a low transmission rate of a line and inconvenience due to ignorance of the server regarding various individual client characteristics.

Another object of the present invention is to provide a data transmission system and method which satisfies the users accessing a data providing service by converting data which is provided by the server of the data providing service to data with a proper data amount and data type for each of the clients or by generating such data.

Another object of the present invention is to provide a data transmission system and method which satisfies the users in any environment by sending the data from the server to the client after modifying data according to client characteristics and a transmission rate of a communication line.

According to one aspect of this invention, data is transmitted from a server, which stores the data in a client that requests the data via a transmission line. The data transmission system includes an information collector, which collects information about the client at the server and a selective transmitter, which determines the amount of data that can be transmitted to the client based upon the information collected by said information collector, selects transmitting data from the data stored by the server based on the amount of data and transmits the transmitting data selected to the client.

According to another aspect of this invention, data is transmitted from a server, which stores the data a client that requests the data via a transmission line. The data transmission method includes a step for collecting information on the client at the server and a step for determining an amount of data that can be transmitted to the client based on the information collected in said information collecting step, and selecting transmitting data from the data stored by the server based upon the amount of data and transmitting the transmitting data selected to the client.

Further scope of applicability of the present invention will become apparent from the detailed description give hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF EXPLANATION OF THE DRAWINGS

The present invention will become more fully understood from the detailed description given hereinbelow and the accompanying drawings which are given by way of illustration only, and thus are not limitative of the present invention, and wherein:

FIG. 2 illustrates a sample of an ability characteristic chart of a client computer according to the present invention;

FIG. 3 illustrates another sample of an ability characteristic chart of a client computer according to the present invention;

FIG. 7 illustrates a sample of a profile according to the present invention;

FIG. 8 illustrates another sample of a profile according to the present invention;

FIG. 10 shows another sample of calculation of a data amount according to the present invention;

FIG. 11 shows a correspondence table according to the present invention;

DESCRIPTION OF THE PREFERRED EMBODIMENTS

A preferred embodiment of the present invention is set forth below.

Figure 1:
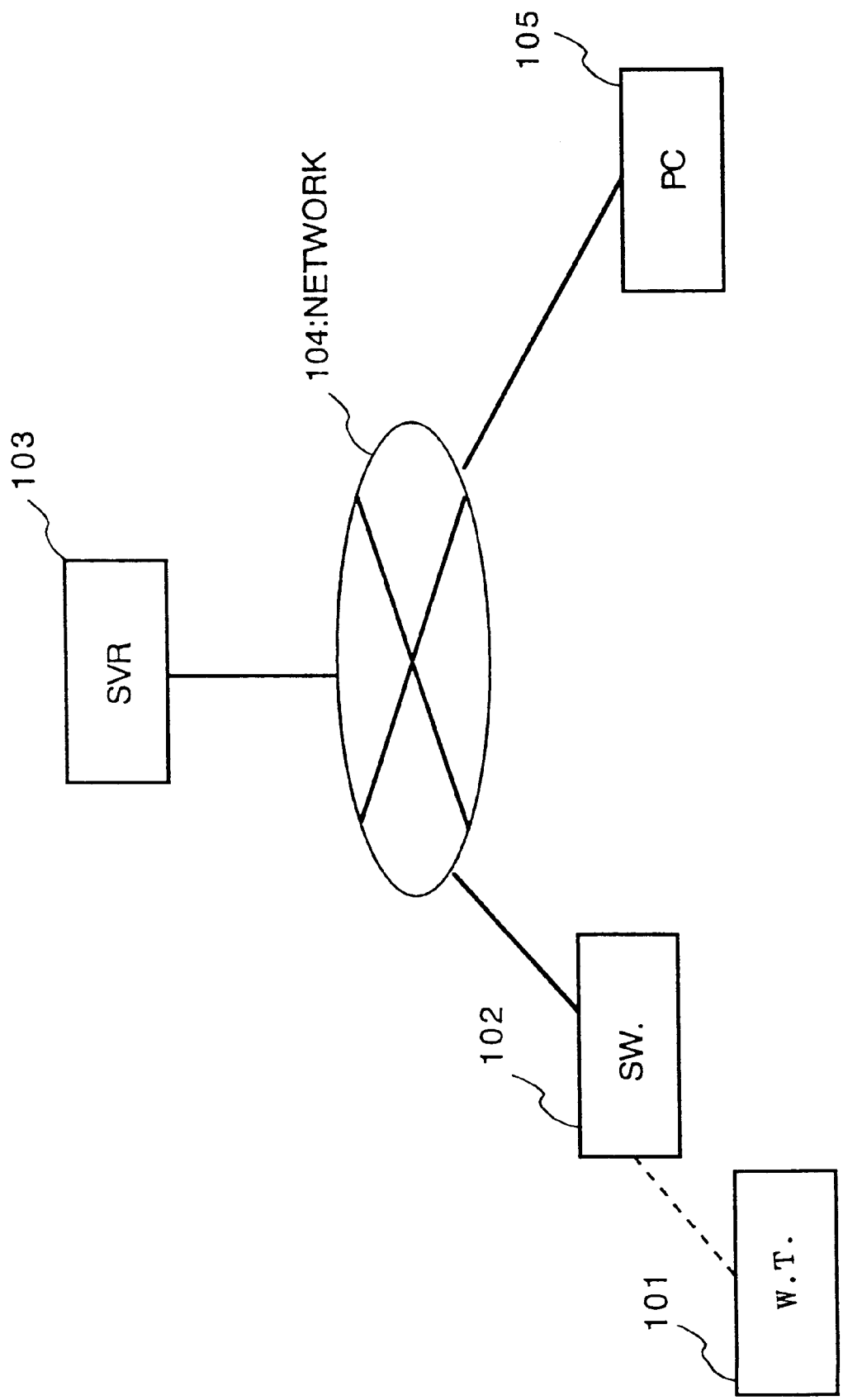
FIG. 1 shows a configuration chart of a data providing system according to the present invention.

In FIG. 1, a server computer (server, hereinafter) 103 is connected to a network 104. The server 103 provides data to the network 104. The server 103 provides the data to all the computers that are connected to the network. In this embodiment, a wireless terminal 101 and a client computer 105 are called clients for convenience sake.

In FIG. 1, the clients are the wireless terminal 101, which is connected to the network 104 via a switching center 102 and the client computer 105. In another embodiment, the client computer 105 is a personal computer. It is assumed that a data transfer rate between the wireless terminal and the switching center averages upto 1 KB/Sec. and a transfer rate of the network 104 averages upto 10 KB/Sec., but of course these values may vary.

The wireless terminal 101 is usually small and light. The wireless terminal 101 may display 160 characters on a screen with a display size of 300×200 dots. The wireless terminal 101 may display 16 colors, for example. In this example, wireless terminal 101 does not have a sound interface that is able to be used for application programs. At the wireless terminal 101, data maybe input by a pen which is a pointer device. A keyboard is typically not provided with the wireless terminal 101.

The client computer 105 may display 2600 characters on a screen with a display size of 1152×864 dots. The client computer 105 may display 65536 colors. The client computer 105 may have a sound interface that is able to be used for application programs. In this example mouse which is a pointer device and a keyboard are provided with the client computer 105.

These exemplary characteristics of the wireless terminal 101 and the client computer 105 are attributes of the terminals. They are shown in FIGS. 2 and 3 respectively as ability characteristic charts.

The attributes of the wireless terminal 101 are shown in FIG. 2. The attributes of the client computer 105 are shown in FIG. 3.

A number of characters 401 which are able to be displayed on a screen, a size of the screen 402 shown in a number of pixels, and a number of displayable different colors 403 are registered as attributes. The presence of a sound interface, a pointer device, and a keyboard are also registered as attributes.

Figure 4:
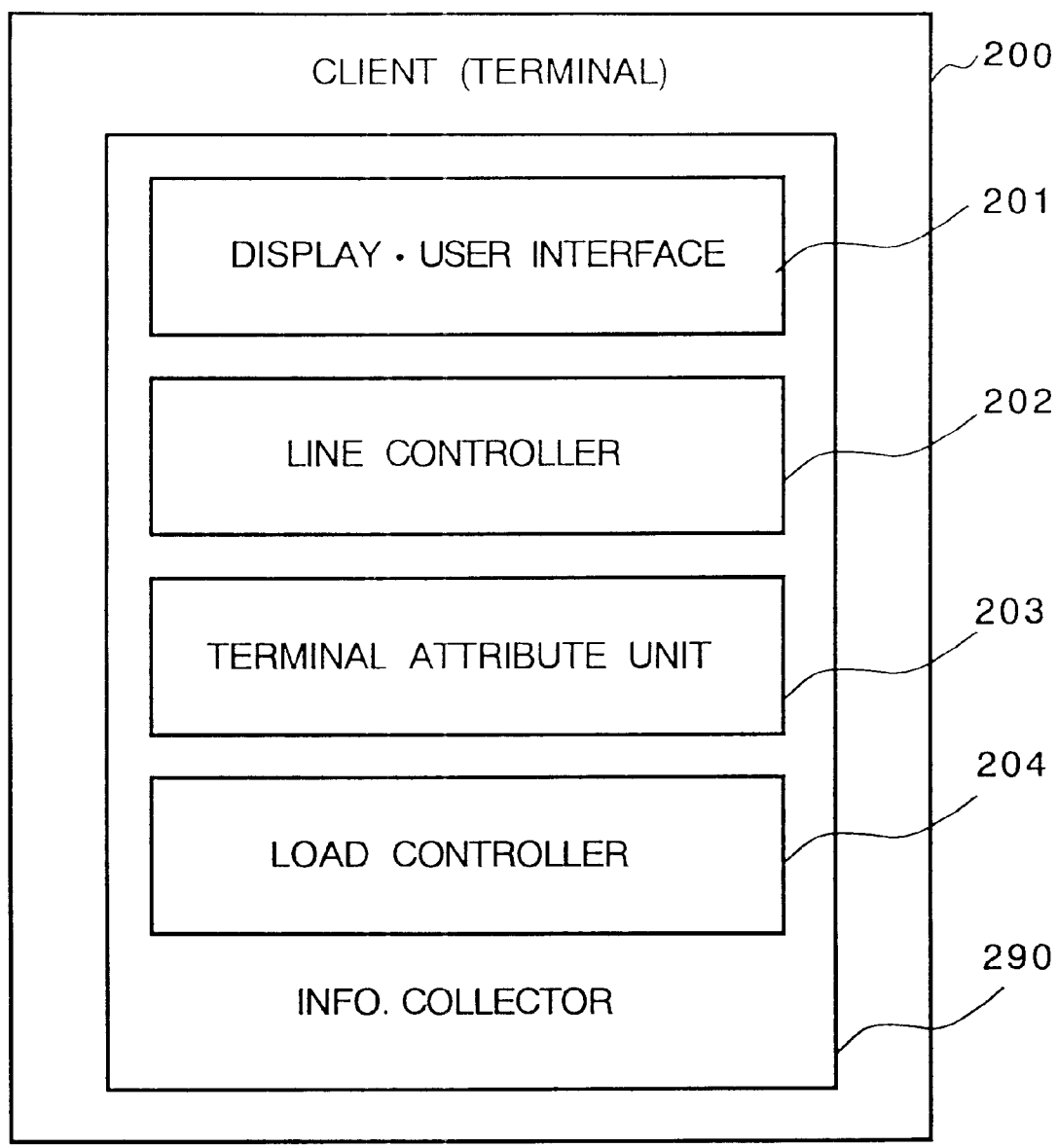
FIG. 4 illustrates sub-elements of a client according to the present invention.

FIG. 4 illustrates sub-elements of a client 200.

In FIG. 4, an information collector 290 collects information about the client 200, which is provided to the server 103. A display•user interface 201 displays data and inputs a time limit for transmitting data and instructions from the user. A line controller 202 collects information about a line connecting the server and the client 200 as information about the client. A terminal attribute unit 203 collects ability characteristics of the client 200 as information about the client. A load controller 204 collects a loading condition of the client 200 as information about the client.

The display•user interface 201 displays data that are obtained from the server and inputs instructions for the server. The line controller 202 is a transmission interface. The line controller 202 exchanges data with the server and obtains statistical data on data transfer rates. The terminal attribute unit 203 stores characteristics of the client 200. When the server requests the terminal attribute unit 203 to describe the characteristics of the client 200, the terminal attribute unit 203 provides the characteristics of the client 200 to the server. The load controller 204 controls a usage condition of a memory of the client 200 and a usage condition of a CPU of the client 200. When the server requests the load controller 204 to provide the usage condition of the memory and the usage condition of the CPU, the load controller 204 provides the usage condition of the memory and the usage condition of the CPU of the client 200 to the server.

Also, any necessary software to receive the data providing services is downloaded from the server to the client 200. Further, when all or a part of the display•user interface 201, the line controller 202, the terminal attribute unit 203 and the load controller 204 require specific software, the specific software is also downloaded from the server.

Figure 5:
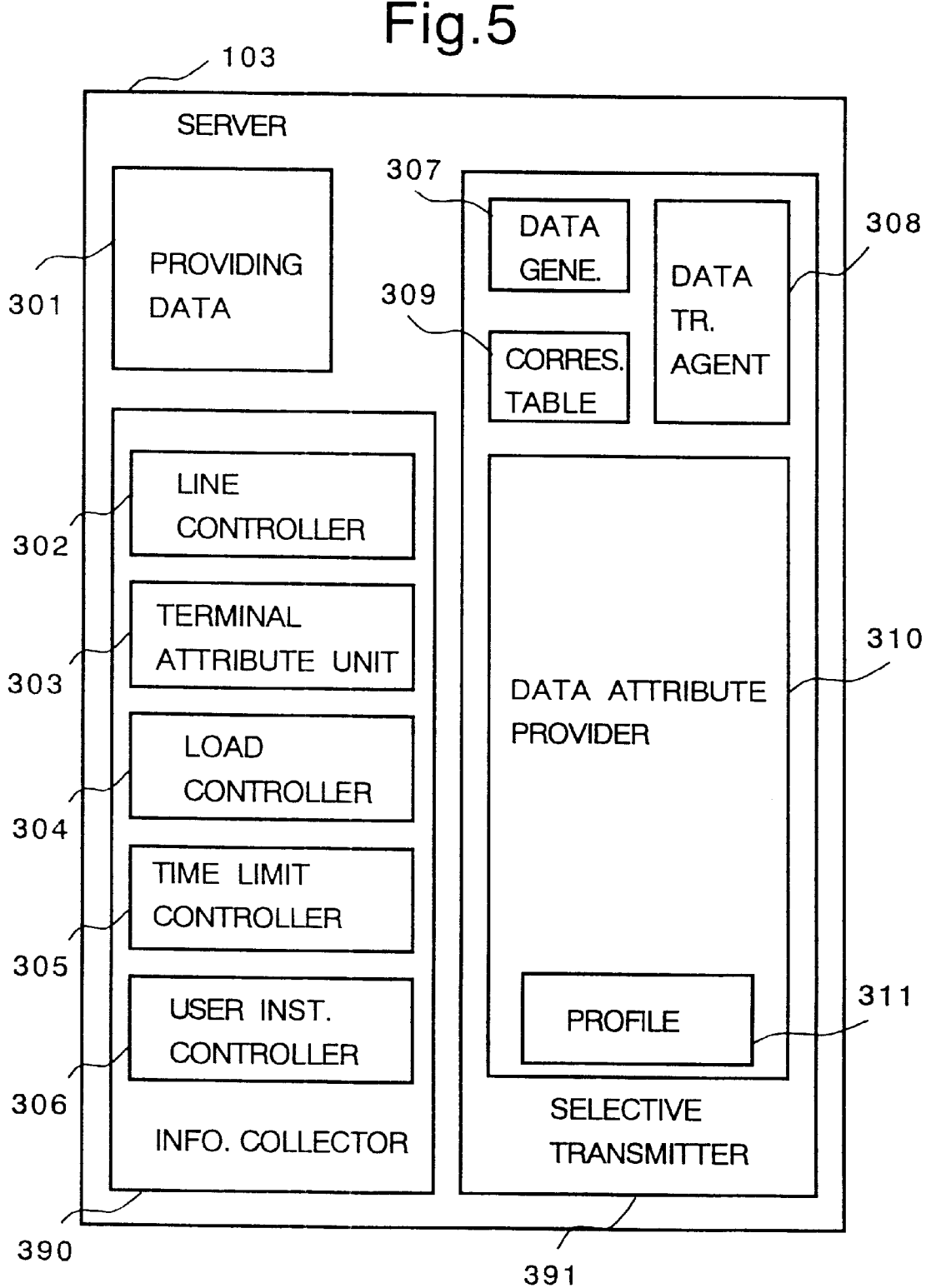
FIG. 5 illustrates sub-elements of a server according to the present invention.

FIG. 5 illustrates sub-elements of the server 103.

In FIG. 5, an information collector 390 collects information about the client 200 at the server 103. A selective transmitter 391 determines an amount of data which is transmitted to the client 200 based upon the information that is collected by the information collector 290 in FIG. 4 and the information collector 390 in FIG. 5. Then, the selective transmitter 391 selects data with a proper data amount from the data that is stored in the server 103, and transmits the selected data.

A line controller 302 collects information on a line connecting the server 103 and the client 200 as information about the client. A terminal attribute unit 303 collects ability characteristics of the client 200 as information about the client. A load controller 304 collects a loading condition of the client 200 as information about the client. A time limit controller 305 collects a time limit for transmitting data which is assigned by the client 200 as information about the client. A client instruction controller 306 collects instructions from the user of the client 200 which are inputted by the user as information about the client 200. A data attribute provider 310 calculates a proper data amount for transmitting based about the information on the client which is collected by the information collectors 290 and 390. The data attribute provider 310 creates a profile that defines a data type and data amount of transmitting data based about the information on the client 200 which is collected by the information collectors 290 and 390.

A data transmitting agent 308 selects data with a proper data amount which is calculated by the data attribute provider 310 and transmits the selected data. The data transmitting agent 308 inputs the profile which is created by the data attribute provider 310, and determines data which should be selected based on the data type that is defined in the profile in reference to a correspondence table 309. The correspondence table 309 shows correspondences between data type and data amount of transmitting data. One example is illustrated in FIG. 11. When the data transmitting agent 308 refers to the correspondence table 309 and judges that a data amount in the correspondence table 309 of the transmitting data exceeds the data amount which is defined in the profile, the data generator 307 generates data that are transmitted to the client 200 by reducing the data amount of the transmitting data up to the data amount which is defined in the profile.

Figure 6:
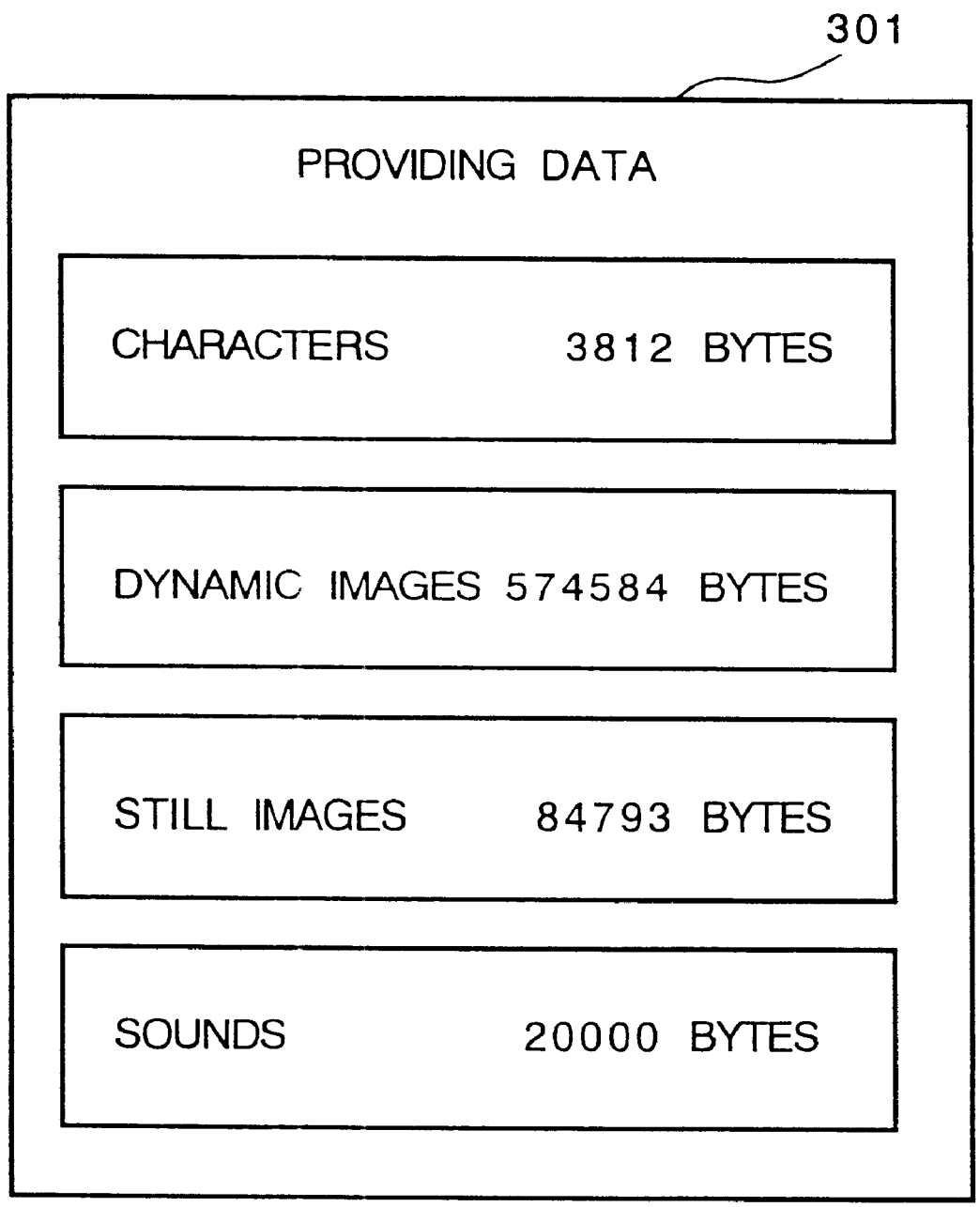
FIG. 6 illustrates a sample of providing data according to the present invention.

Providing data 301 that include characters, dynamic images and still images and sounds as shown in FIG. 6 are provided to the client 200. The line controller 302 is a transmission interface to the client 200. The line controller 302 dynamically determines a transmission rate of the line by measuring a round-trip time between the line controller 302 and the line controller 202. The terminal attribute unit 303 stores characteristics of the client 200 to which data are provided. The load controller 304 requests the load controller 204 to send a loading condition of the client 200. The load controller 304 stores the loading condition of the client 200, if necessary. The load controller 304 also monitors a usage condition of a memory of the server, a usage condition of a CPU, a number of connected terminals, etc.

The time limit controller 305 controls the time limit for transmitting the data, which is requested by the client 200. For example, when a user requests to transmit data within 8 minutes, the time limit controller 305 stores "eight minutes" as a time limit for transmitting the data.

The user instruction controller 306 controls a detail degree of the data and the data types which are instructed by the user. The detail degree of the data is a degree of data reduction for transmission. For example, when the detail degree is 1.0, all the data is transmitted without reduction. When the detail degree is 0.5, the data is reduced to half and transmitted. The data types, as illustrated in FIG. 6, are characters 301a of the client 200, dynamic images 301b, still images 301c and sounds 301d.

The user of the client 200 inputs the detail degree and the data types by a display function and an instruction input function of the display•user interface 201. Then, the client 200 sends the detail degree and the data types to the user instruction controller 306 of the server 103.

The data attribute provider 310 receives information from each of the line controller 302, terminal attribute unit 303, load controller 304, time limit controller 305 and the user instruction controller 306, and creates a profile based upon information received from the client 200, which defines a data amount and data type of the data that should be transmitted to the client 200.

FIG. 7 illustrates an example of a profile 311a which is created.

The profile 311a includes the data type 312a and data amount 313a. The data type 312a includes a dynamic image 312a1, a still image 312a2 and a sound 312a3.

The example of FIG. 7 is the profile 311a of the wireless terminal 101. Since the transmission rate of the line of the wireless terminal 101 is very low and the wireless terminal 101 does not have a sound interface, it is useless to transmit data of the dynamic image 312a1 and the sound 312a3. Therefore, only data of the still image 312a2 and characters are transmitted. Because character data are always transmitted, the character data are not included in the data type 312a. A value of the data amount is calculated by an equation which is illustrated in FIGS. 9, 10 and explained later, and the calculated value is defined in the profile 311a.

An example of a profile 311b of the client computer 105 is shown in FIG. 8. Elements in FIG. 8 correspond to the elements identified and discussed with respect to FIG. 7. Accordingly, a detailed discussion is omitted.

By evaluating from ability characteristics and a transmission rates of a line, it is determined to transmit all of the dynamic image, the still image, the sound and the character to the client computer 105. A value of the data amount is calculated by an equation which is illustrated in FIGS. 9, 10 and explained later, and the calculated value is defined in the profile 311b.

Figure 9:
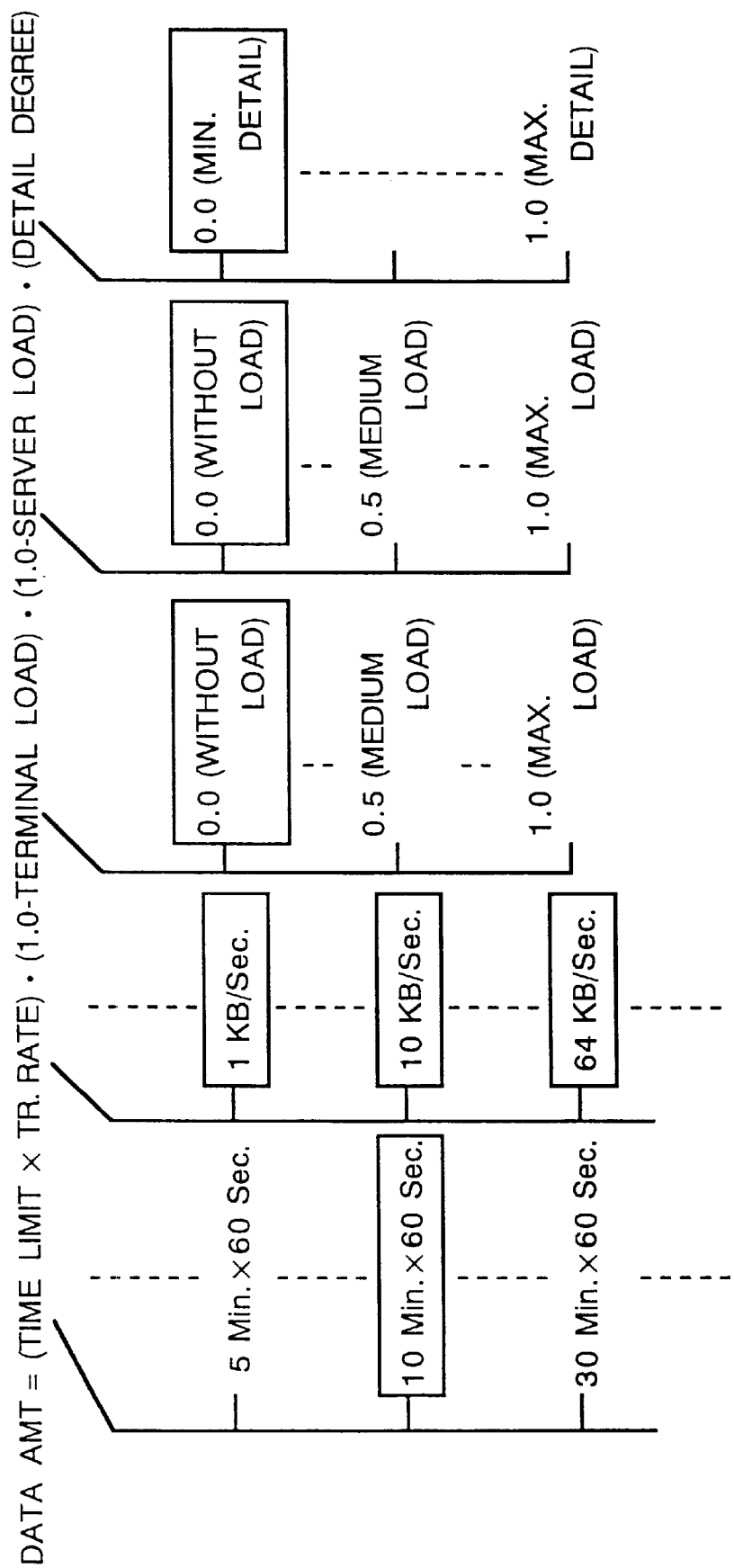
FIG. 9 shows an equation to calculate a data amount according to the present invention.

FIG. 9 shows a sample of the equation which is used to calculate the value of the data amount 313a, 313b by the data attribute provider 310.

The data amount 313a, 313b is mainly determined by a product of a value of the time limit for transmitting the data and a value of the transmission rate of the line. Secondarily, the data amount 313a, 313b is also determined by a value of the load on the client 200, a value of the load on the server 103 and a value of the detail degree which is instructed by the user of the client 200.

FIG. 10 shows examples of calculations of the data amount for the wireless terminal 101 and the client computer 105 by the equation of FIG. 9.

From the calculations, a proper data amount for transmission is 75000 byte for the wireless terminal 101 and 750000 byte for the client computer 105. The calculated values are defined as the data amounts 313a, 313b in the profiles 311a, 311b in FIGS. 7 and 8 respectively. The profiles 311a, 311b are provided to the data transmission agent 308. The data transmission agent 308 selects data with reference to the correspondence table 309 as shown in FIG. 11.

In FIG. 11, Tables 1–5 are shown. These tables are stored in the correspondence table 309 in advance of data transmission. Dynamic image, still image and sound which correspond to the data types in Tables 1–5 are stored as providing data 301 as shown in FIG. 6.

Because character data are always transmitted, character data are not included in the data type in each of the tables. If character data is treated as data which are transmitted selectively, the character data may be included in the tables as one of the data types. Information indicating whether the character is transmitted or not may be also provided in the tables.

The correspondence table 309 of FIG. 11 includes five tables. Each value in the five tables are provided in advance of any data transmission.

In FIG. 11, Table 1 is applied when all of the character, dynamic image, still image and sound are transmitted. The data amount in Table 1 are obtained by accumulating data amounts of all of the providing data in FIG. 6 (683189 Bytes=3812+574584+84793+20000 Bytes).

Table 2 is applied when the character, still image and sound are transmitted. The data amount in Table 2 are obtained by accumulating each of data amounts of the character, still image and sound in FIG. 6 (108605 Bytes= 3812+84793+20000 Bytes).

Each data amounts in Tables 3, 4 and 5 are also obtained by accumulating data amounts of data in FIG. 6 (23812 Bytes=3812+20000 Bytes, 88605 Bytes=3812+84793 Bytes, 3812 Bytes=3812 Bytes).

Five tables which are shown in FIG. 11 are only examples. Tables with other combinations of data types may be generated in advance.

The data transmission agent 308 determines transmitting data by comparing the profile 311a, 311b which is provided by the data attribute provider 310 with the correspondence table 309.

For example, when the data transmission agent 308 receives the profile 311b as shown in FIG. 8, the data transmission agent 308 selects Table 1 which has a matched combination of the data types with the profile 311b from the tables in the correspondence table 309.

When the data amount of Table 1 is smaller than the data amount of the profile 311b in FIG. 8, the dynamic image 701, still image 702 and sound 703 which are defined in Table 1 are transmitted to the client completely.

When the data transmission agent 308 receives the profile 311a as shown in FIG. 7, the data transmission agent 308 selects Table 4 which has a matched combination of the data types with the combination in the profile 311a from the tables in the correspondence table 309. Then, the data transmission agent 308 compares the data amount of FIG. 7 and the data amount of Table 4. Since the data amount of Table 4 is greater than the data amount of FIG. 7 (88605 Bytes>75000 Bytes), the data transmission agent 308 judges that it is not possible to transmit the data of Table 4 completely. When the data transmission agent 308 is not able to select a data amount in the correspondence table, the data generator 307 reduces the data amount and generates data with a data amount which is the same or smaller than the data amount specified in the profile 311a. Then, the data transmission agent 308 transmits the generated data to the client 200.

When the data amount of FIG. 7 is smaller than the data amount of Table 4, at least one of the data amounts of the still image 702 and the character must be reduced. For example, data of the still image 702 are transmitted in every other line or in every three lines in order to reduce the data.

Operation of the data providing service according to this embodiment are explained from a step of requesting the server 103 to connect to the client 200.

Figure 12:
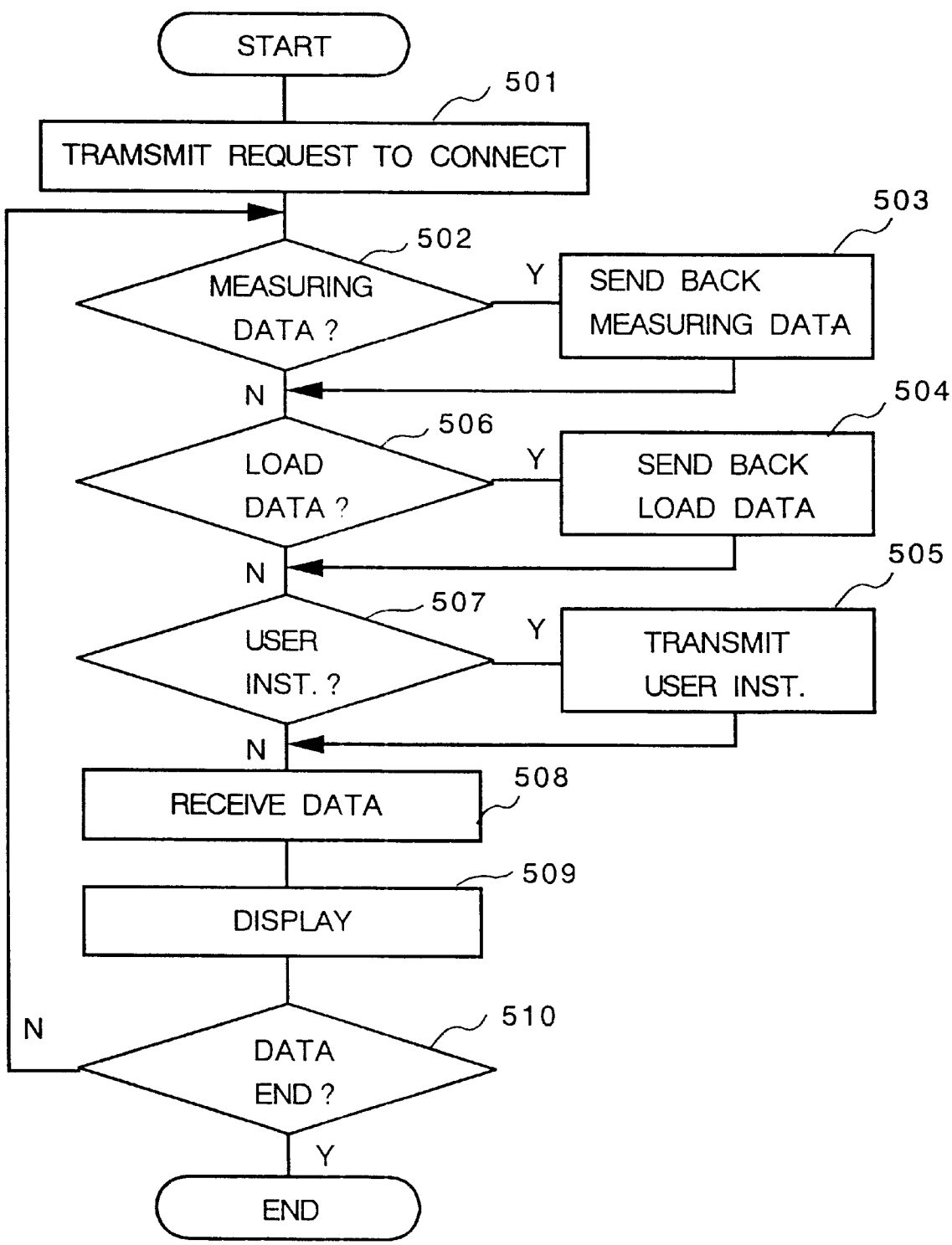
FIG. 12 shows a sample flow chart of client processing according to the present invention.
Figure 13:
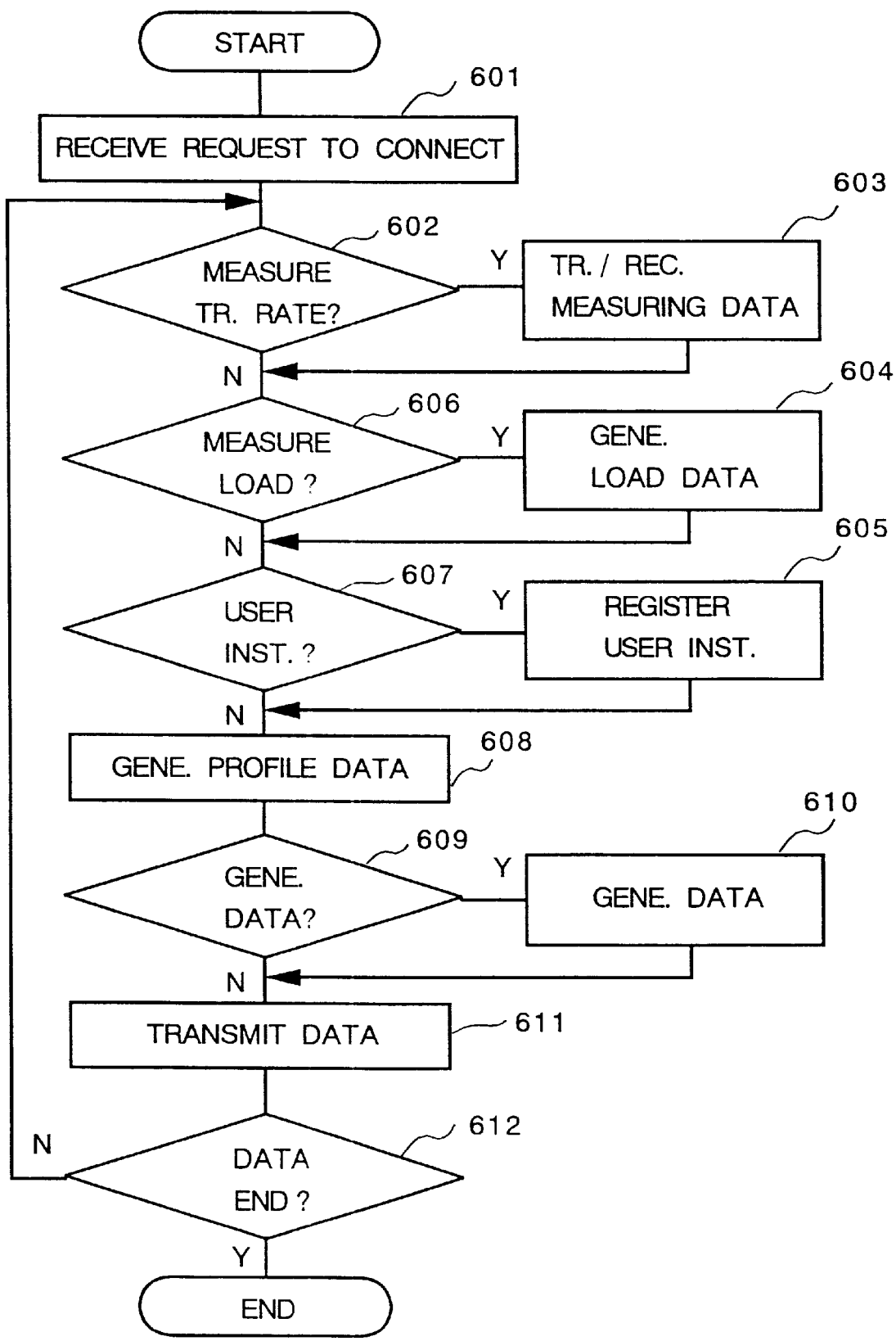
FIG. 13 shows a sample flow chart of server processing according to the present invention.
Figure 14:
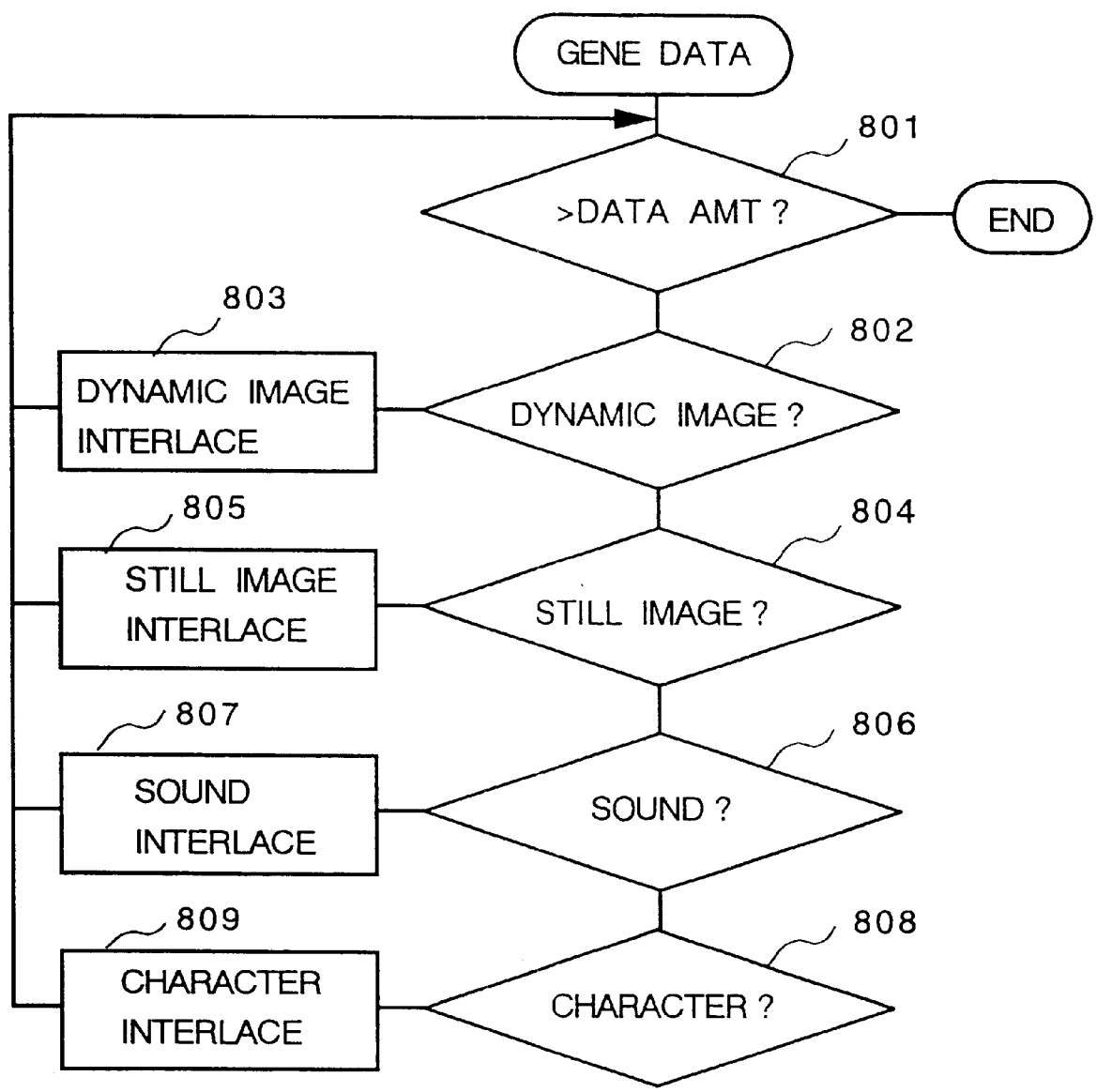
FIG. 14 shows a sample flow chart of generating a transmitting data by interlace processing by a data generator according to the present invention.

A flow chart of processing in the client 200 is shown in FIG. 12. A flow chart of processing in the server 103 is shown in FIG. 13. A flow chart of processing in the data generator 307 is shown in FIG. 14. The operations are explained with reference to the flow charts.

In step 501, the client 200 requests the server 103 to connect to the client 200. The request to connect includes a transfer of attributes as shown in FIGS. 2 or 3.

When the server 103 receives the request to connect in step 601, the server 103 registers the attributes which are included in the request to connect in the terminal attribute unit 303. Then, the server 103 judges if it is necessary to measure a transmission rate of the line in step 602. If it is obvious that a pre-registered transmission rate of the line is fast enough, it is not necessary to measure the transmission rate of the line. When it is judged that it is necessary to measure the transmission rate of the line, the server 103 transmits measuring data to the client 200 and receives the measuring data in step 603, and measures a round-trip time of the measuring data.

Meanwhile, the client 200 judges if received data from the server 103 is the measuring data, and sends back a part of the measuring data to the server 103 in step 503. Accordingly, the round-trip time is measured, and a data amount which is able to be transmitted per hour is calculated. The calculated data amount is registered in the line controller 302.

When the measured value is too low compared with the pre-registered transmission rate of the line, it is judged that a load on the client 200 must be measured in step 606. Then, the server 103 requests the client 200 to transmit load data in step 604. When the client 200 recognizes the request as load request data in step 506, the client 200 sends a loading condition of the client 200 to the server 103 in step 504. The server 103 registers the loading condition of the client 200 together with a most recent loading condition of the server 103 in the load controller 304.

When the server 103 judges that there is much restriction on a data amount of transferring data and instructions from the user are necessary in step 607, the server 103 requests the user to transmit instructions in step 605. The client 200 receives the request to transmit the instructions from the server 103 in step 507. The client 200 receives instructions from a user of the client 200 on the detail degree of the data and the time limit of data transmission by the display•user interface 201.

When the instructions from the user are inputted to the client 200, the client 200 transmits the instructions to the server 103 in step 505. The server 103 registers the time limit to transmit the data in the time limit controller 305 and the detail degree of the data in the client instruction controller 306 in step 605.

The server 103 refers to data which are provided in each of the line controller 302, terminal attribute unit 303, load controller 304, time limit controller 305, and client instruction controller 306 which are provided by the data attribute provider 310 and creates the profile 311a in step 608. When the server 103 creates the profile 311a, the server 103 judges which data should be transmitted among the dynamic image 701, still image 702 and sound 703 and registers each of the data as the data type in the profile 311a. Then, the server 103 calculates a proper data amount of data for transmitting, which includes character data according to the equation of FIG. 9, for example. The server 103 registers the calculated data amount in the profile 311a.

The server 103 checks if the data type in the profile 311a which is created in step 609 matches one of the tables stored in the correspondence table 309 (for example, Tables 1–5 in FIG. 10). When it is judged that the data amount which is provided in a table with matched data type is less than the data amount in the profile 311a, the data are transmitted completely in step 611. When it is judged that the data amount which is provided in the table with matched data type is greater than the data mount in the profile 311a, data generation (step 610) as shown in the flow chart of FIG. 14 is performed, and the data amount is reduced. Then, the entire data amount is checked in step 801. When there is dynamic image data, thinning (thinning means to reduce data) is performed for the dynamic Image data to reduce the data amount. If the data amount is still too large even after thinning, thinning is continued for the still image data, sound data and character data until the data amount reaches a level which is able to be transmitted.

Thinning for characters is performed by selecting data which are marked by a character control code or a tag code (<H1>, <H2>, <U>, etc.) of a description language (e.g., Hyper Text Mark-Up Language: HTML), which describes providing data, or by selecting a beginning word of each character line, etc. or by deleting data in every other character line until the data amount reaches a desired level.

When a certain amount of transmitting data, e.g., data for one screen, is prepared for transmitting, the prepared data is transmitted to the client 200 in step 612. The client 200 receives the data in step 508, and displays the data on a screen in step 509. In steps 510 and 612, the client 200 continues to repeat the processing which is shown in FIGS. 12 and 13 in real time until all the data is transmitted. Since the processing which is shown in FIGS. 12 and 13 are repeated even during data transmission, the server 103 is able to dynamically collect information about the client 200. The server 103 continues to judge the data amount of transmitting data even during transmission of the data. Hence, the server is able to dynamically select the transmitting data.

As stated, in the data transmission method according to this embodiment, the condition of the transmission line connecting the server 103 and the client 200 and ability characteristics of the client 200 are detected, and a proper amount of transmitting data is judged based on the detected information. According to this embodiment, contents of the transmitting data are automatically selected based on the data amount of the transmitting data and the ability characteristics of the client 200, and data with the selected content are transmitted.

According to the present invention, changes in the line conditions are detected during transmission, and contents of the transmitting data is dynamically selected.

According to the present invention, a time limit to transmit data is assigned by the client 200. Contents of data with a proper data amount for the time limit is selected and data with the selected content are transmitted.

According to the present invention, a loading condition of the client 200 is dynamically detected, and a content of data with a proper data amount is selected based on the loading condition. Then, data with the selected content is transmitted.

According to the present invention, a loading condition of the server is dynamically detected, and a content of data with a proper data amount is selected based on the loading condition. Then, data with the selected content is transmitted.

According to the present invention, a data amount of transmitting data is provided by instructions from the client 200 even during transmission, and a content of data with a proper data amount is selected. Then, data with the selected data content is transmitted.

According to the present invention, instructions from the client 200 are detected, and a content of data is selected based on the instructions.

As stated, according to this embodiment, a data providing server transmits data with a proper data content and amount to the client by Judging connection conditions to various communication networks and function characteristics of various clients. Therefore, a client of the data providing service is able to obtain satisfactory service regardless of the connection conditions and function characteristics of the client. Further, a time limit to transmit data and a detail degree of the transmitting data are provided by instructions from the client.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data transmission system, wherein data is transmitted from a server, which contains the data, via a transmission medium, comprising:
    the server including a first information collector which collects information about at least one client; and
    a selective transmitter which determines a total amount of data and at least one type of data of a dynamic image, a still image, a sound and a character that can be transmitted to the at least one client based upon the information collected by said first information collector, reduces an amount of data of at least one type of the at least one type of data determined in case that a total of each amount of the at least one type of data is bigger than the total amount determined, and selectively transmits the data contained in the server to the at least one client based upon the amount of the data and the at least one type of data the at least one client is able to receive.

2. The data transmission system of claim 1, wherein said first information collector includes a line controller which collects information about the transmission medium connecting the server and the at least one client as the information about the at least one client.

3. The data transmission system of claim 1, wherein said first information collector includes a terminal attribute unit which collects information about ability characteristics of the at least one client as the information about the at least one client.

4. The data transmission system of claim 1, wherein said first information collector includes a load controller which collects information about a loading condition of the at least one client as the information about the at least one client.

5. The data transmission system of claim 1, wherein said first information collector includes a time limit controller which collects a time limit to transmit the data, which is assigned by the at least one client, as the information about the at least one client.

6. The data transmission system of claim 1, wherein said first information collector includes a user instruction controller which collects user instructions which are inputted by a user of the at least one client as the information about the at least one client.

7. The data transmission system of claim 1, wherein said first information collector collects the information about the at least one client during transmission of the data, wherein said selective transmitter determines the amount of data which can be transmitted to the at least one client dynamically during transmission of the data and selects the transmitting data dynamically.

8. The data transmission system of claim 1, wherein said first information collector includes,
    a data attribute provider which calculates the amount of data for transmitting based on the information about the at least one client which is collected by said first information collector, and
    a data transmission agent which selects data with a matched data amount with the amount of data calculated by said data attribute provider.

9. The data transmission system of claim 8, wherein said selective transmitter includes a correspondence table which shows a correspondence between a data type and a data amount of the transmitting data, wherein said data attribute provider creates a profile which defines a data type and a data amount of the transmitting data based upon the information about the at least one client which is collected by said first information collector,
    wherein said data transmission agent inputs the profile which is created by said data attribute provider and determine data which should be selected based upon the data type which is defined in the profile with reference to said correspondence table.

10. The data transmission system of claim 9, wherein said selective transmitter further comprises a data generator which generates the data which is transmitted to the at least one client by reducing a data amount of the transmitting data to reach the data amount which is defined in the profile, when the data amount which is defined in the profile is less than the data amount in the correspondence table.

11. A data transmission method, wherein data is transmitted from a server, which contains the data, via a transmission medium, comprising the steps of:

collecting information about at least one client by the server; and determining a total amount of data and at least one type of data of a dynamic image, a still image, a sound and a character that can be transmitted to the at least one client based upon the information collected in said information collecting step, reducing an amount of data of at least one type of the at least one type of data determined in case that a total of each amount of the at least one type of data is bigger than the total amount determined, and selectively transmitting the data contained in the server based upon the amount of data and the at least one type of data that the at least one client is able to receive.

12. The data transmission method of claim 11, wherein said information collecting step includes at least one of a sub-step of collecting information on the transmission medium connecting the server and the at least one client as the information about the at least one client, a sub-step of collecting information on ability characteristics of the at least one client as the information about the at least one client, a sub-step of collecting information of loading condition of the at least one client as the information about the at least one client, a sub-step of collecting a time limit to transmit the data, which is assigned by the at least one client, as the information about the at least one client, and a sub-step of collecting a user information which is inputted by a user of the at least one client as the information about the at least one client.

13. The data transmission method of claim 11, wherein said information collecting step collects the information about the at least one client during transmission of the data, wherein said data amount determining step determines the amount of data which can be transmitted to the at least one client dynamically during transmission of the data and said transmitting data selecting step selects the transmitting data dynamically.

14. The data transmission method of claim 11, wherein said information collecting step includes the sub-steps of calculating the amount of data for transmitting based on the information about the at least one client, and selecting data with a matched data amount with the amount of data calculated.

15. The data transmission method of claim 14, wherein the data amount determining step includes a sub-step of referring to a correspondence table which shows a correspondence between a data type and a data amount of the transmitting data, wherein said calculating step creates a profile which defines a data type and a data amount of the transmitting data based on the information about the at least one client which is collected in said information collecting step, wherein said selecting step inputs the profile which is created and determines data which should be selected based on the data type which is defined in the profile with reference to the correspondence table.

16. The data transmission method of claim 15, wherein the data amount determining step includes a sub-step of generating data which is transmitted to the at least one client by reducing a data amount of the transmitting data to reach the data amount which is defined in the profile, when the data amount which is defined in the profile is less than the data amount in the correspondence table.

17. The data transmission system of claim 9, wherein said data transmission agent selects one of a plurality of pre-stored tables of said correspondence table to determine the data type and data amount of data which should be selected and transmitted to the at least one client.

18. The data transmission system of claim 9, wherein said data transmission agent creates a table with the data type and data amount which is appropriate for the at least one client and stores the table in the correspondence table.

19. The data transmission method of claim 15, wherein said selecting step selects one of a plurality of prestored tables of the correspondence table to determine the data type and data amount which should be selected and transmitted to the at least one client.

20. The data transmission method of claim 15, wherein said selecting step creates a table with the data type and data amount which is appropriate for the at least one client and stores the table in the correspondence table.

21. The data transmission system of claim 1, wherein the at least one client includes a second information collector that collects information about the at least one client and transmits the collected information to the server.

22. The data transmission system of claim 21, wherein the at least one client further includes a display user-interface that displays data, allows a user to input time limits for receiving data from the server and accepts data transmission instructions from the user for use by the server.

23. A data transmission method for reducing the transmission of superfluous data from a server to at least one client in response to the at least one client request for data, comprising:

creating an attribute table for the at least one client, said attribute table including a plurality of first data types and a first data amount, wherein the attribute table represents a total amount of data and at least one type of data of a dynamic image, a still image, a sound and a character, the at least one client is able to receive at one time;

creating a correspondence table that includes a plurality of sub-tables, each sub-table including a different combination of a plurality of second data types and a second data transmitting amount, wherein each combination represents a server data transmission rate for each type of the at least one client having a specific second data type configuration;

selecting a sub-table from the correspondence table, in response to the at least one client requesting data from the server, based upon the correspondence between the at least one client attribute table and the sub-table of the correspondence table such that an amount of data of at least one type of the at least one type of data is less than the total amount determined; and transmitting from the server to the at least one client data represented by the second data types contained in the selected correspondence table sub-table.

24. The data transmission method of claim 23, wherein the transmitting step further comprises reducing a data amount of the data to be transmitted to the at least one client to equal the first data amount in the client attribute table when the first data amount in the at least one client attribute table is less than the at least one second data amount in the selected correspondence table sub-table.

* * * * *